(12) United States Patent
Williams et al.

(10) Patent No.: US 9,836,066 B2
(45) Date of Patent: Dec. 5, 2017

(54) VORTEX DIFFUSER FOR ROTATING/STATIONARY INTERFACES

(71) Applicant: Caterpillar Inc., Peoria, IL (US)

(72) Inventors: Brian James Williams, Normal, IL (US); Mark Allen Batdorff, Washington, IL (US); Timothy Lorentz, Morton, IL (US); Jay Robert Steffen, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 476 days.

(21) Appl. No.: 14/333,324

(22) Filed: Jul. 16, 2014

(65) Prior Publication Data

US 2016/0018825 A1    Jan. 21, 2016

(51) Int. Cl.
  *F16L 55/027*  (2006.01)
  *G05D 7/01*    (2006.01)
  *F15B 21/00*   (2006.01)
  *F15D 1/00*    (2006.01)

(52) U.S. Cl.
  CPC .......... *G05D 7/0186* (2013.01); *F15B 21/006* (2013.01); *F15D 1/00* (2013.01)

(58) Field of Classification Search
  CPC ........ F15B 21/006; G05D 7/0186; F15D 1/00
  USPC ................................ 138/39, 40; 192/3.33
  See application file for complete search history.

(56) References Cited

U.S. PATENT DOCUMENTS

| | | | |
|---|---|---|---|
| 2,783,702 A | | 3/1957 | O'Day |
| 4,105,372 A | * | 8/1978 | Mishina ............... F01D 15/12 415/122.1 |
| 4,248,140 A | * | 2/1981 | Hendricks ............. F24F 13/075 454/336 |
| 5,575,363 A | | 11/1996 | Dehrmann et al. |
| 6,374,612 B1 | | 4/2002 | Gladden et al. |
| 6,621,263 B2 | | 9/2003 | Al-Janabi et al. |
| 7,469,689 B1 | * | 12/2008 | Jones ..................... F02B 33/40 123/41.31 |
| 8,414,368 B2 | * | 4/2013 | Hansen ................. F04D 25/14 137/512.1 |

FOREIGN PATENT DOCUMENTS

WO  WO 2013/021366 A2  2/2013
WO  WO 2014/004628 A2  1/2014

* cited by examiner

*Primary Examiner* — Vishal Pancholi
(74) *Attorney, Agent, or Firm* — Miller, Matthias & Hull LLP; Jeffrey A. Greene

(57) ABSTRACT

In hydraulic systems having rotating-stationary component interfaces, a bore pressure regulating mechanism is provided to interact with the hydraulic fluid in a control volume to maintain a hydraulic fluid pressure in a longitudinal shaft bore at or approximately equal to a supply pressure when a gear shaft rotates within the control volume. In one aspect, the bore pressure regulating mechanism minimizes vortex flow of the hydraulic fluid induced by the rotation of the gear shaft. In another aspect, the bore pressure regulating mechanism provides a direct feed of pressurized hydraulic fluid proximate an opening of the longitudinal shaft bore through an end surface of the gear shaft, and thereby minimizes the opportunity for the hydraulic fluid to be forced into vortex flow by the gear shaft in the area of the longitudinal shaft bore.

20 Claims, 9 Drawing Sheets

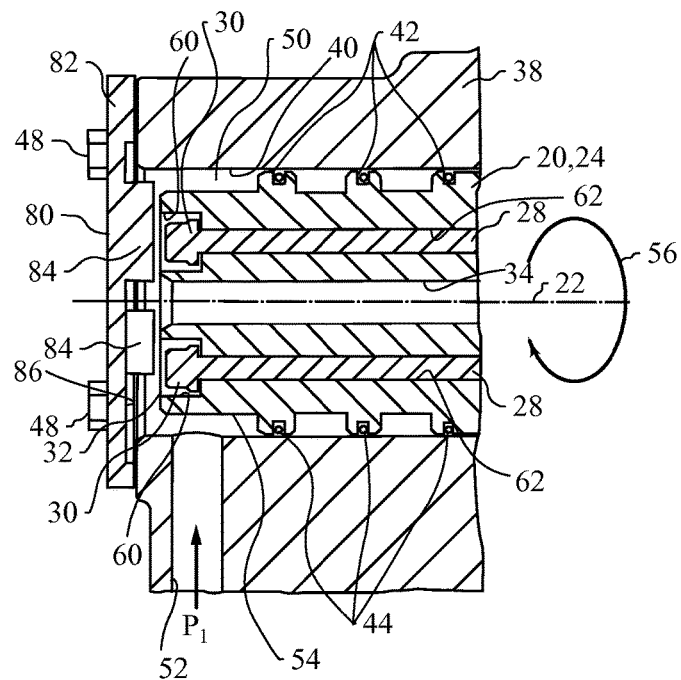
FIG.6
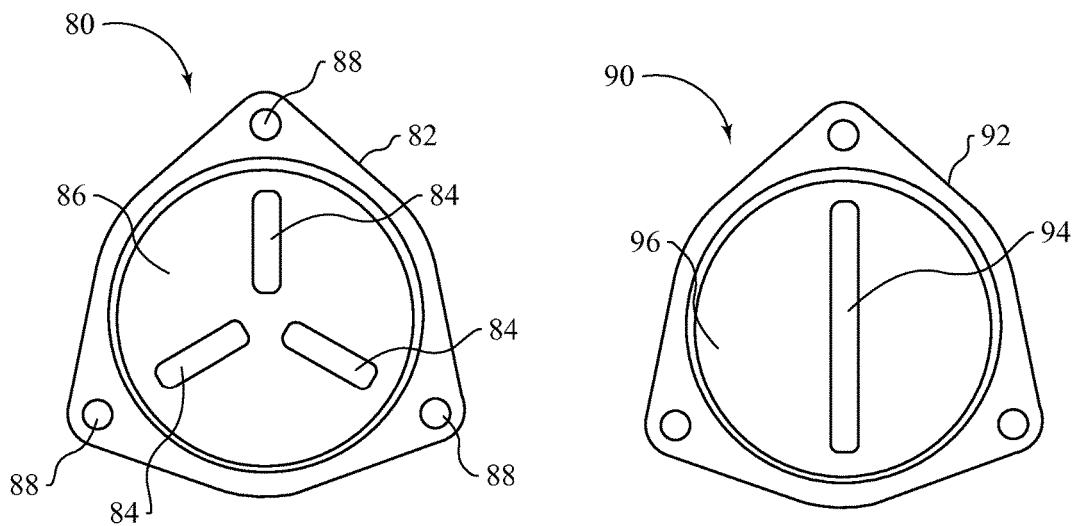
FIG.7
FIG.8

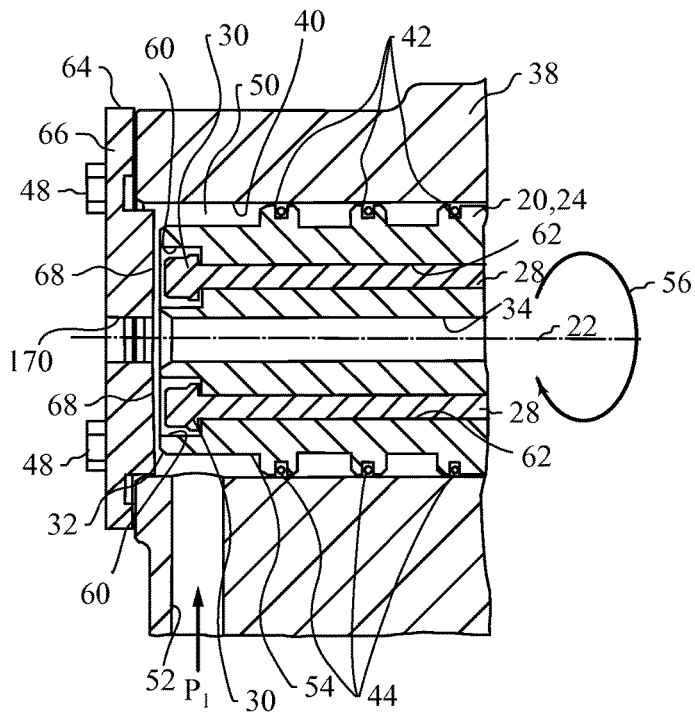
FIG.20
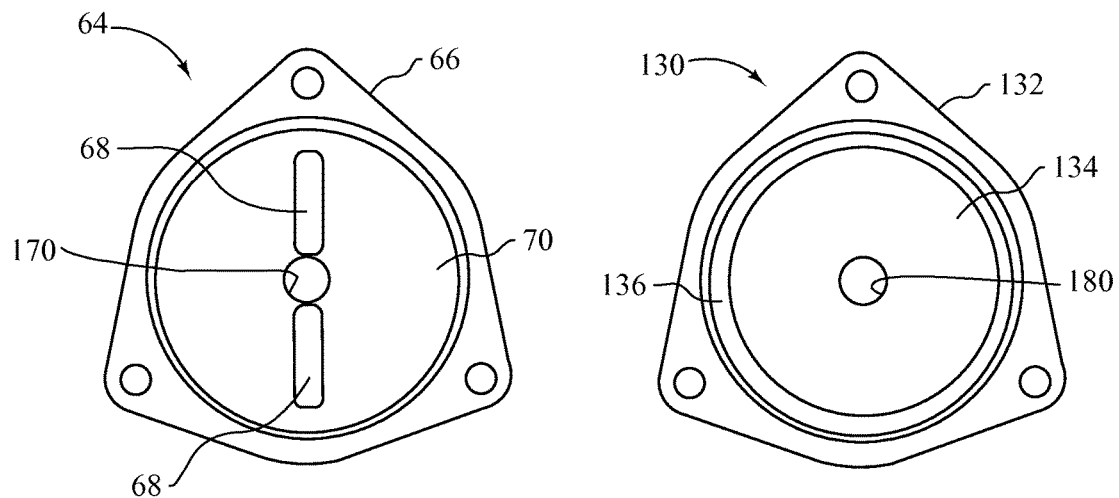
FIG.21
FIG.22

US 9,836,066 B2

VORTEX DIFFUSER FOR ROTATING/STATIONARY INTERFACES

TECHNICAL FIELD

The present disclosure relates generally to regulating control volumes of hydraulic fluids at interfaces between rotating and stationary components, and more particularly, to vortex diffusers, direct pressure feeds and other bore pressure control mechanisms for regulating hydraulic pressure at an axial bore of a rotating component.

BACKGROUND

In hydraulic systems that have rotating components, such as gear shafts and crank shafts, rotating proximate stationary components of the system at an interface, hydraulic system pressure and flow rates can vary with speed of the rotating components. The pressure variance is due to rotational velocity imparted on a fluid control volume affected by the rotating components. The rotational effect on the fluid results in a vortex having fluid pressures that vary from a minimum pressure proximate a longitudinal axis of the rotating component to higher pressures as the control volume extends radially outward from the longitudinal axis. Depending on the geometries of the components, the vortex effect can be impactful to the overall function of the hydraulic system.

In one exemplary hydraulic system, rotating gear shafts in some transmissions have longitudinal shaft bores placing pressurized hydraulic fluid from a control volume in fluid communication with other internal components of the transmission. The pressurized hydraulic fluid from the control volume may be communicated through the longitudinal shaft bore to a balance piston for a clutch that engages and disengages the gear shaft. Hydraulic fluid from the longitudinal shaft bore may provide the necessary pressure to keep the clutch disengaged at appropriate times during the operation of the transmission assembly. At high shaft speeds, the vortex in the control volume may reduce the pressure at the longitudinal axis and the longitudinal shaft bore sufficiently to allow the clutch to engage when the clutch should be disengaged. In these conditions, the pressure of the hydraulic fluid input to the control volume must be increased to raise the pressure within the longitudinal bore shaft to the level necessary to prevent such inadvertent engagement.

Some systems are known where disturbances may be caused in fluids at interfaces involving rotating and stationary components. For example, U.S. Pat. No. 6,621,263, issued on Sep. 16, 2003 to Al-Janabi et al. and entitled, "High-Speed Corrosion-Resistant Rotating Cylinder Electrode System," discloses a test device with a cell body enclosing a test fluid and having disposed therein, among other components, a stationary reference electrode and a rotating working electrode. A cap on the working electrode has a conical upper surface to minimize artificial disturbances to the fluid flow at the surface of the working electrode. The length of the working electrode is relatively small compared to the depth of the test fluid to further assist in reducing vortex phenomena within the cell body. Though the configuration of the upper surface of the rotating component (working electrode) is configured to minimize disturbances and vortex phenomena in the test device, the rotating component does not have a longitudinal shaft bore as is present in the gear shafts of some transmission assemblies 10 and other rotating-stationary component interfaces. Consequently, it is uncertain whether a pressure could be maintained in a longitudinal shaft bore if a generally planar shaft end surface of a gear shaft were replaced by the conically shaped surface of the Al-Janabi et al. test device. In view of this, a need exists for an improved rotating-stationary component interface that reduces or eliminates vortex flows and corresponding reduced fluid pressure in a control volume proximate a longitudinal axis and longitudinal bore of the rotating component.

SUMMARY OF THE DISCLOSURE

In one aspect of the present disclosure, a rotating-stationary component interface is disclosed. The rotating-stationary component interface may include a housing wall having a housing bore with a bore longitudinal axis, a fluid supply passage intersecting the housing bore, and a cylindrical shaft aligned along the bore longitudinal axis and having a longitudinal shaft bore extending through the cylindrical shaft from an opening through a shaft end surface of the cylindrical shaft. A shaft end portion of the cylindrical shaft may be received by the housing bore and rotatably supported therein, and the housing wall and the shaft end portion may define a control volume such that the fluid supply passage places the control volume in fluid communication with a pressurized hydraulic fluid source for supplying pressurized hydraulic fluid having a supply pressure. The rotating-stationary component interface may further include a bore pressure control mechanism disposed within the control volume and interacting with the pressurized hydraulic fluid within the control volume to maintain a shaft bore pressure at the opening of the longitudinal shaft bore approximately equal to the supply pressure when the cylindrical shaft rotates about the bore longitudinal axis.

In another aspect of the present disclosure, a bore pressure control mechanism for a rotating-stationary component interface is disclosed. The rotating-stationary component interface may be formed by a housing wall having a housing bore with a bore longitudinal axis, a fluid supply passage intersecting the housing bore, and a cylindrical shaft aligned along the bore longitudinal axis and having a longitudinal shaft bore extending through the cylindrical shaft from an opening through a shaft end surface. A shaft end portion of the cylindrical shaft may be received by the housing bore and rotatably supported therein, and the housing wall and the shaft end portion may define a control volume such that the fluid supply passage may place the control volume in fluid communication with a pressurized hydraulic fluid source for supplying pressurized hydraulic fluid having a supply pressure. The bore pressure control mechanism may include a baffle disposed within the control volume and engaged by the housing wall, and the baffle may engage the pressurized hydraulic fluid to reduce vortex flow of the pressurized hydraulic fluid about the bore longitudinal axis when the cylindrical shaft rotates about the bore longitudinal axis to maintain a shaft bore pressure at the opening of the longitudinal shaft bore approximately equal to the supply pressure when the cylindrical shaft rotates.

In a further aspect of the present invention, a bore pressure control mechanism for a rotating-stationary component interface is disclosed. The rotating-stationary component interface may be formed by a housing wall having a housing bore with a bore longitudinal axis, and a cylindrical shaft aligned along the bore longitudinal axis and having a longitudinal shaft bore extending through the cylindrical shaft from an opening through a shaft end surface. A shaft end portion of the cylindrical shaft may be received by the housing bore and rotatably supported therein, and the housing wall and the shaft end portion may define a cavity. The bore pressure control mechanism may include a cylindrical baffle portion disposed within the cavity and engaged by the housing wall, and a feed passage through the cylindrical baffle portion to place a pressurized hydraulic fluid source for supplying pressurized hydraulic fluid having a supply pressure in fluid communication with the opening of the longitudinal shaft bore.

Additional aspects are defined by the claims of this patent.

BRIEF DESCRIPTION OF THE DRAWINGS

FIG. 6 is a cross-sectional view of the transmission assembly of FIG. 1 taken through line 2-2 showing the rotating/stationary element interface with a second embodiment of bore pressure regulation in accordance with the present disclosure;

FIG. 7 is a front view of a cap of the transmission assembly of FIG. 6 having baffles for bore pressure regulation in accordance with the present disclosure;

FIG. 8 is a front view of a cap of FIG. 7 having an alternative baffle configuration for bore pressure regulation in accordance with the present disclosure;

FIG. 20 is a cross-sectional view of the transmission assembly of FIG. 1 taken through line 2-2 showing the rotating/stationary element interface with a further embodiment of bore pressure regulation in accordance with the present disclosure;

FIG. 21 is a front view of a cap of FIG. 20 having baffles and an axial pressure bore for bore pressure regulation in accordance with the present disclosure; and FIG. 22 is a front view of an alternative embodiment of the cap of FIG. 20 having a cylindrical baffle and an axial pressure bore for bore pressure regulation in accordance with the present disclosure.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
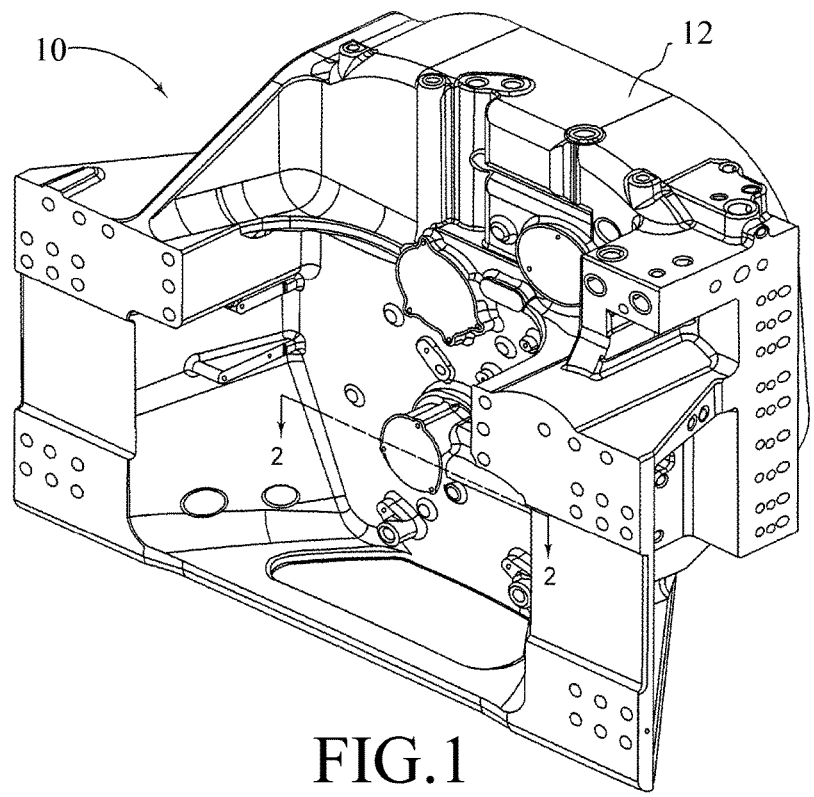
FIG. 1 is a perspective view of a transmission assembly for a work machine in which bore pressure regulation in accordance with the present disclosure may be implemented.
Figure 2:
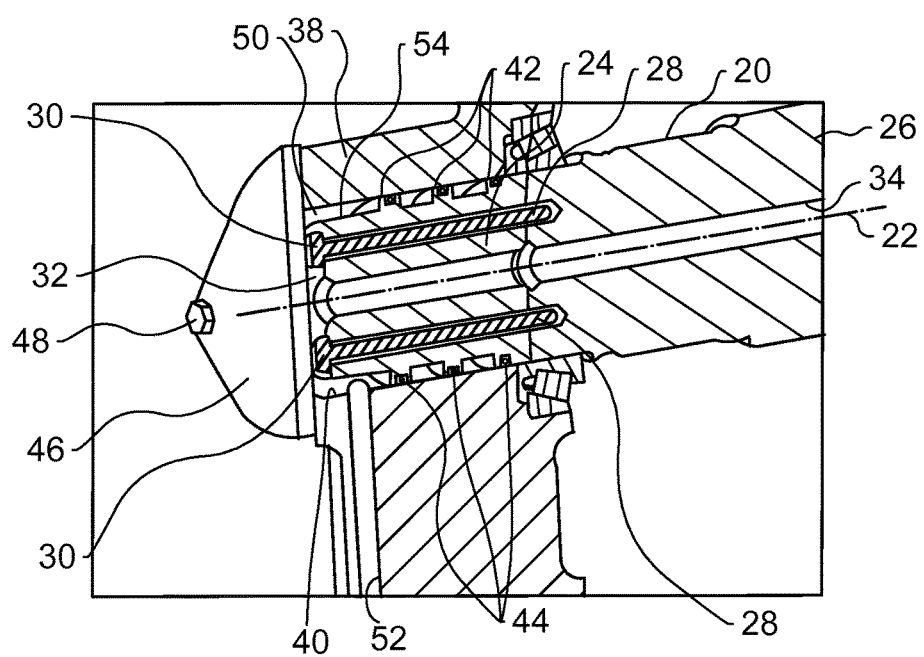
FIG. 2 is a perspective cross-sectional view of the transmission assembly of FIG. 1 taken through line 2-2 showing a rotating/stationary element interface without bore pressure regulation in accordance with the present disclosure.
Figure 3:
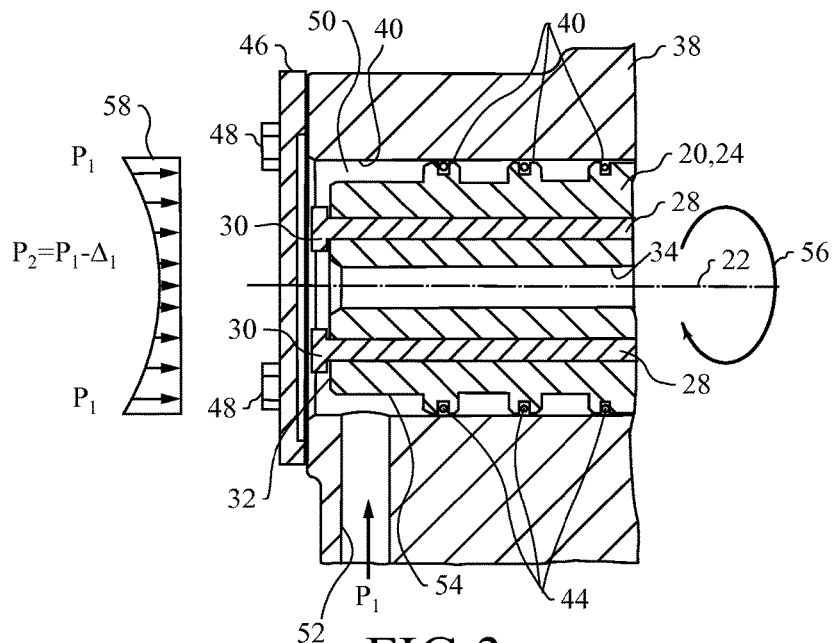
FIG. 3 is a cross-sectional view of the transmission assembly of FIG. 1 taken through line 2-2 showing the rotating/stationary element interface without bore pressure regulation in accordance with the present disclosure.

FIGS. 1-3 illustrate one example of a hydraulic system having rotating/stationary component interfaces in the form of a transmission assembly 10 for a work machine. Referring to FIG. 1, the transmission assembly 10 includes an outer housing 12 enclosing the moving components of the transmission assembly 10 such as gear shafts, idler shafts, gears, clutches and the like. The transmission assembly 10 may further include hydraulic components, such as control valves (not shown), flow channels through the housing 12 and other components (not shown) and the like, providing hydraulic fluid for controlling the operation of internal components of the transmission assembly 10. The transmission assembly 10 also includes an input shaft (not shown) for operative connection to a drive shaft from a power source such as an internal combustion engine (not shown), and an output shaft (not shown) for operative connection to traction devices (not shown) for propelling the work machine over a surface or other driven components of the work machine.

FIG. 2 is a perspective view of a cross-section of a portion of the transmission assembly 10 wherein the housing 12 supports a generally cylindrical gear shaft 20 aligned along and rotatable about a bore longitudinal axis 22. The gear shaft 20 may be formed by multiple components, including a shaft end portion 24 attached to and longitudinally aligned with a shaft main portion 26 by a plurality of bolts 28 having bolt heads 30 extending beyond a shaft end surface 32 of the shaft end portion 24. The gear shaft 20 further includes a longitudinal shaft bore 34 aligned with the bore longitudinal axis 22 and forming a hydraulic fluid passage providing fluid to other internal components of the transmission assembly 10. The longitudinal shaft bore 34 leads to one or more radially extending passages (not shown) that provide hydraulic fluid to other components of the transmission assembly 10. For example, hydraulic fluid may be provided to a balance piston for a clutch that engages and disengages the gear shaft 20. Hydraulic fluid from the longitudinal shaft bore 34 may provide the necessary pressure to keep the clutch disengaged at appropriate times during the operation of the transmission assembly 10. While the longitudinal shaft bore 34 is illustrated in the various embodiments herein as being aligned or coincident with the bore longitudinal axis 22, those skilled in the art will understand that the longitudinal shaft bore 34 may be offset from the bore longitudinal axis 22 and a longitudinal axis of the gear shaft 20. Where the longitudinal shaft bore 34 is offset, the various bore pressure control mechanisms may be adjusted accordingly to provide the appropriate pressure at the opening of the longitudinal shaft bore 34 during rotation of the gear shaft 20, and such adjustments are contemplated by the inventors.

A housing end wall 38 includes a housing bore 40 to receive and rotatably support the shaft end portion 24 of the gear shaft 20. The shaft end portion 24 may include one or more annular flanges 42 radially extending from an outer surface thereof and having rotating seals or other appropriate seals 44 engaging a bore inner surface defining the housing bore 40 to substantially minimize leakage of hydraulic fluid. An open end of the housing bore 40 may be closed off and sealed by a housing bore end wall in the form of a removable cap 46 demountably attached to the housing end wall 38 by fasteners such as bolts 48. The cap 46 may be removed when necessary to disconnect the shaft end portion 24 from the shaft main portion 26 of the gear shaft 20 and replace the seals 44 without the necessity of disassembling the housing end wall 38 from the housing 12. However, in alternate implementations, the housing bore end wall 46 may be formed as an integral component of the housing end wall 38, with the housing end wall 38 being removed from the housing to provide access to the shaft end portion 24.

A cavity or control volume 50 for hydraulic fluid is defined by the housing bore 40, the housing bore end wall or cap 46 and the portion of the shaft end portion 24 outward of the outermost annular flange 42. In this embodiment, pressurized hydraulic fluid is provided to the control volume 50 via a hydraulic fluid supply passage 52 defined within the housing end wall 38 and intersecting the housing bore 40 within the portion defining the control volume 50. The supply passage 52 may be in fluid communication with a pressurized hydraulic fluid source (not shown) located upstream from the control volume 50 to regulate the pressure within the control volume 50 and the longitudinal shaft bore 34, and to control the operation of the clutch as discussed above.

When the gear shaft 20 is stationary or rotating slowly, the fluid in the control volume 50 is not subjected to significant shear forces from the shaft end surface 32 and cylindrical shaft outer surface 54 of the gear shaft 20. As a result, minimal vortex flow occurs in the control volume 50. Because the fluid in the control volume 50 is relatively undisturbed, the fluid pressure in the supply passage 52 is communicated to the control volume 50 and down the longitudinal shaft bore 34 to the balance piston and the clutch.

As the angular velocity of the gear shaft 20 increases, the shear forces between the surfaces 32, 54 and the fluid in the control volume 50 increase, and the bolt heads 30 rotate through the fluid at a faster rate. A vortex within the control volume 50 is created. Referring to FIG. 3, rotation of the gear shaft 20 is indicated by an arrow 56. Pressurized fluid is communicated to the control volume 50 and, correspondingly the longitudinal shaft bore 34, through the supply passage 52 at a supply pressure $P_1$. The rotational forces imparted on the fluid in the control volume 50 by the surfaces 32, 54 and the bolt heads 30 stir the fluid. As the swirling continues to increase, centrifugal force draws the fluid away from the bore longitudinal axis 22 and toward the surface defining the housing bore 40. Simultaneously, the fluid pressure transitions from the uniform supply pressure $P_1$ across the control volume 50 to a pressure distribution that varies radially across the shaft end surface 32 as indicated by a pressure gradient 58 on the left side of FIG. 3. As shown by the pressure gradient 58, the control volume 50 has maximum fluid pressure approximately equal to the supply pressure $P_1$ at the surface of the housing bore 40, and a minimum fluid pressure $P_2$ proximate the bore longitudinal 22 after experiencing a pressure drop $\Delta_1$. As the pressure decreases at the center of the control volume 50, a corresponding pressure decrease in a shaft bore pressure is experienced within the longitudinal shaft bore 34 and in downstream passages (not shown). At high rotational speeds of the gear shaft 20, the pressure decrease can be significant enough to allow the clutch to engage when it should be disengaged, thereby compromising the operation of the transmission assembly 10.

In the transmission assembly 10 of FIGS. 1-3 and similar hydraulic systems having rotating-stationary component interfaces, a bore pressure regulating mechanism in accordance with the present disclosure is provided to interact with the hydraulic fluid in the control volume to maintain the pressure of the hydraulic fluid in the longitudinal shaft bore 34 at or approximately equal to the supply pressure $P_1$ of the fluid supply passage 52 when the gear shaft 20 rotates within the housing bore 40. In one aspect, the bore pressure regulating mechanism minimizes vortex flow of the hydraulic fluid induced by the rotation of the gear shaft 20. In another aspect, the bore pressure regulating mechanism provides a direct feed of pressurized hydraulic fluid proximate an opening of the longitudinal shaft bore 34 through the shaft end surface 32 of the gear shaft 20, and thereby minimizes the opportunity for the hydraulic fluid to be forced into vortex flow by the gear shaft 20 in the area of the longitudinal shaft bore 34. Particular embodiments of the bore pressure regulating mechanism may implement flow minimization, direct pressure feed or a combination of these aspects to control the hydraulic pressure at the longitudinal shaft bore 34. In the various embodiments, the desired pressure at the balance piston of a clutch and other components may be maintained according to the control strategy for performing gear shifting in the transmission assembly 10.

Figure 4:
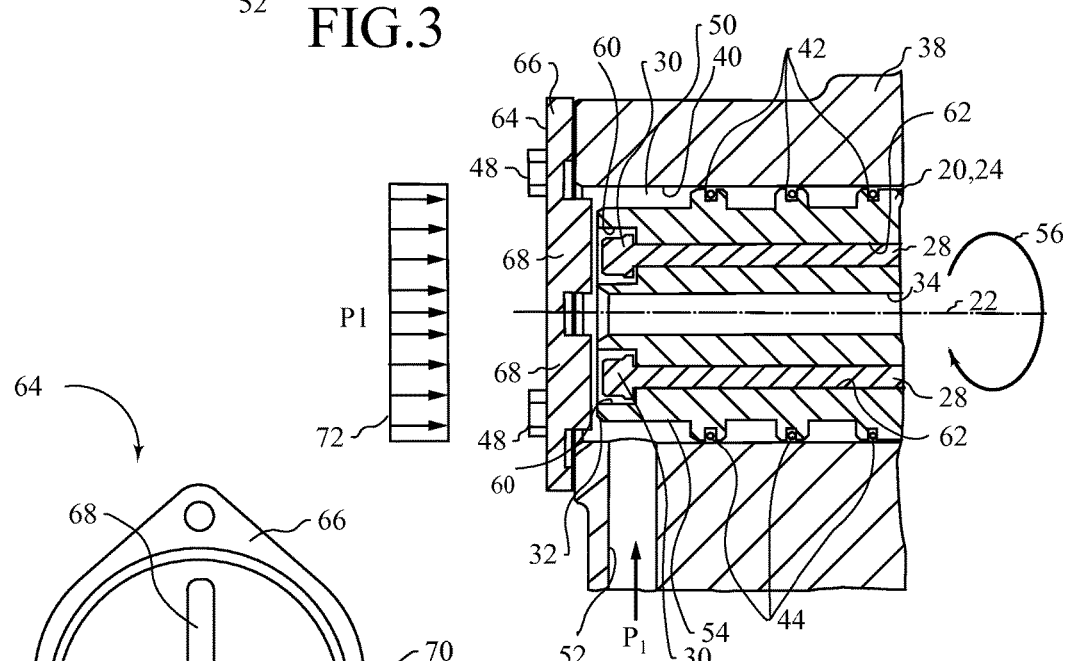
FIG. 4 is a cross-sectional view of the transmission assembly of FIG. 1 taken through line 2-2 showing the rotating/stationary element interface with a first embodiment of bore pressure regulation in accordance with the present disclosure.
Figure 5:
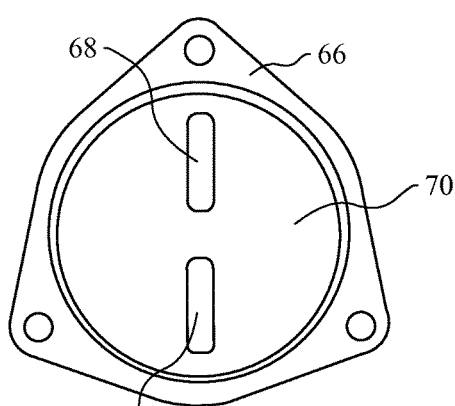
FIG. 5 is a front view of a cap of the transmission assembly of FIG. 4 having baffles for bore pressure regulation in accordance with the present disclosure.

FIGS. 4 and 5 are an illustration of a first embodiment of a bore pressure regulation mechanism for achieving vortex flow minimization at the rotating-stationary component interface. In this and the following embodiments, similar elements of the transmission assembly 10 to those illustrated and described above are identified using the same reference numerals. Referring to FIG. 4, the effect of the bolt heads 30 as the gear shaft 20 rotates may be reduced or eliminated by providing counterbores 60 at the bolt bores 62 into which the bolts 28 are inserted. The counterbores 60 may have a counterbore inner diameter that is greater than a bolt head outer diameter of the bolt heads 30, and a depth that is greater than a height of the bolt heads 30 so that the bolt heads 30 are fully recessed below the shaft end surface 32 of the gear shaft 20. By being recessed within the counterbores 60, the bolt heads 30 do not flow through the fluid in the control volume 50 as the gear shaft 20 rotates. The discontinuity in the shaft end surface 32 may be further reduced or eliminated by providing plugs (not shown) that are inserted into the counterbores 60 and onto the bolt heads 30, and are substantially flush with the shaft end surface 32 to make the shaft end surface 32 substantially planar with the exception of the longitudinal shaft bore 34 at the center.

The vortex flow may be further reduced by providing a modified housing bore end wall or removable cap 64 in accordance with the present disclosure. The cap 64 may have a generally planar base or plate 66 with a plurality of baffles 68 extending inwardly from a cap inner surface 70 of the plate 66 toward the shaft end surface 32 of the gear shaft 20. As shown in FIG. 5, in the present embodiment, the cap 64 includes a pair of baffles 68 approximately linearly aligned on the cap inner surface 70 and separated by a gap that is substantially axially aligned with the longitudinal shaft bore 34 (FIG. 4) when the cap 64 is attached to the housing end wall 38. The baffles 68 have a thickness placing baffle end surfaces of the baffles 68 in close proximity to the shaft end surface 32 of the gear shaft 20 to substantially restrict the flow of hydraulic fluid there between. In certain embodiments, the baffles 68 may include shaft seals (not shown) on the baffle end surfaces engaging the shaft end surface 32 to further prevent fluid flow without restricting the rotation of the gear shaft 20. As the gear shaft 20 rotates at high speeds, the baffles 68 substantially minimize vortex flow around the bore longitudinal axis 22 to a degree that a significant drop in pressure does not occur at the opening of the longitudinal shaft bore 34. The clearance between the baffle end surfaces of the baffles 68 and the shaft end surface 32 may be as small as approximately 0.8 mm (approximately 0.0315 inch) without the baffles 68 engaging the shaft end surface 32 and impeding the rotation of the gear shaft 20, and may be as large as approximately 12.0 mm (approximately 0.4724 inch) and still maintain the desired pressure at the longitudinal shaft bore 34. The gap between the baffles 68 allows the longitudinal shaft bore 34 to remain in fluid communication with the fluid supply passage 52 and not limit flow of hydraulic fluid into the longitudinal shaft bore 34. As indicated by a pressure gradient 72 shown to the left in FIG. 4, the arrangement of the cap 64 maintains the pressure across the shaft end surface 32 relatively constant at a value approximately equal to the supply pressure P1 from the fluid supply passage 52.

The arrangement of the cap 64 may be modified to have any desired number of baffles 68 for reducing the vortex flow within the control volume 50 and correspondingly control and maintain the pressure at the longitudinal shaft bore 34. For example, FIGS. 6 and 7 illustrate an embodiment of a housing bore end wall or removable cap 80 having a substantially planar base or plate 82 with three baffles 84 extending inwardly from a cap inner surface 86 toward the shaft end surface 32 of the gear shaft 20. The baffles 84 may have substantially the same dimensions as the baffles 68 of the cap 64, and similar proximity baffle end surfaces to the shaft end surface 32 as described above to minimize vortex flow. As best seen in FIG. 7, the baffles 84 may be circumferentially spaced about the cap inner surface 86 and be separated by a gap that substantially axially aligns with the longitudinal shaft bore 34 (FIG. 6) when the cap 80 is attached to the housing end wall 38 so that the longitudinal shaft bore 34 remains in fluid communication with the fluid supply passage 52. The baffles 84 may each be radially aligned with a corresponding bolt hole 88 through the plate 82 and through which corresponding bolts 48 are inserted during assembly. With the three baffles 84 aligned with the corresponding bolt holes 88, the cap 80 may be installed in any of three discrete positions and have the same spatial relationships between the baffles 84, the longitudinal shaft bore 34 and the fluid supply passage 52, thereby eliminating any potential uncertainty by an installer as to the proper positioning of the baffles 84 within the control volume 50. The three baffles 84 may also be circumferentially spaced but not aligned with the bolt holes 88 and still provide consistent special relationships with the longitudinal shaft bore 34 and fluid supply passage 52 in each installation position.

In a further embodiment shown in FIG. 8, a housing bore end wall or removable cap 90 may include a planar base or plate 92 having a single elongated baffle 94 extending from an inner surface 96. The single baffle 94 may have a baffle length that is at least equal to a shaft end outer diameter of the shaft end portion 24, and may be centrally aligned on the inner surface 96 so that the baffle 94 is disposed across from the longitudinal shaft bore 34 when the cap 90 is attached to the housing end wall 38. To prevent restricting flow of hydraulic fluid to the longitudinal shaft bore 4, the baffle 94 may have a width that is less than a shaft bore inner diameter of the longitudinal shaft bore 34 so that the baffle 94 does not completely overlay the longitudinal shaft bore 4. If necessary, the baffle 94 may further include a recessed notch in a surface facing the shaft end surface 32 opposite the shaft bore 36 to provide additional clearance from the longitudinal shaft bore 34 to allow flow of pressurized hydraulic fluid from the fluid supply passage to enter the longitudinal shaft bore 34.

Figure 9:
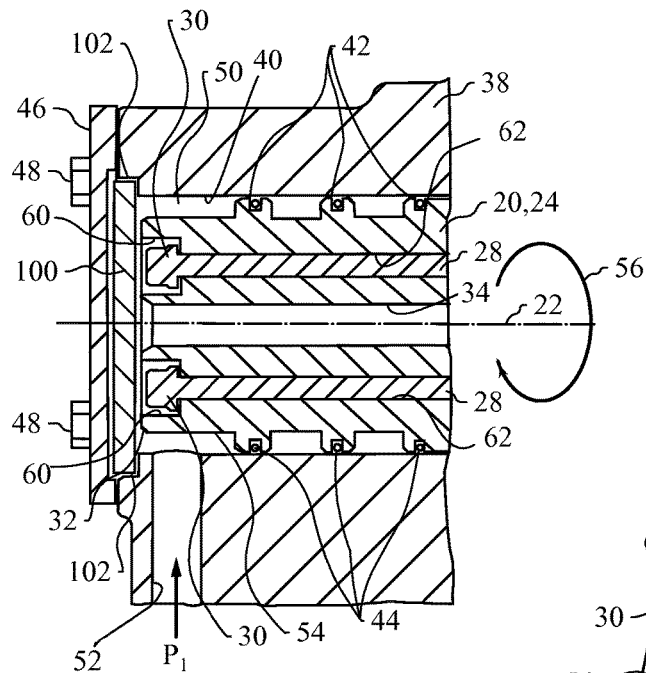
FIG. 9 is a cross-sectional view of the transmission assembly of FIG. 1 taken through line 2-2 showing the rotating/stationary element interface with a further embodiment of bore pressure regulation in accordance with the present disclosure.
Figure 10:
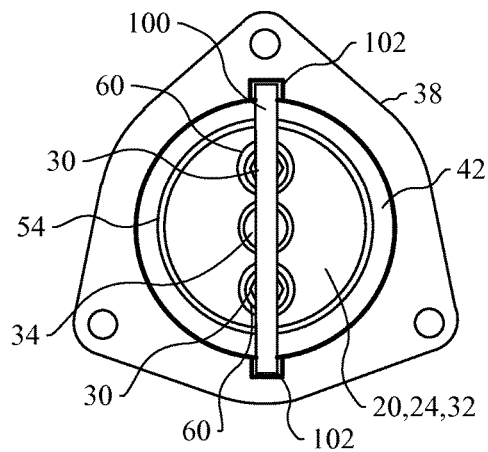
FIG. 10 is an end view of the transmission assembly of FIG. 9 with the cap removed to show an integrated housing baffle for bore pressure regulation in accordance with the present disclosure.

In other embodiments, baffles may be provided within the control volume 50 as components separate from the housing end wall or the cap 46 or housing end wall. In such embodiments, the housing end wall 38 may be modified to receive and engage the baffles and retain the baffles in position as the gear shaft 20 rotates. Referring to FIGS. 9 and 10, an elongated baffle 100 may be inserted into the housing bore 40 of the housing end wall 38 before the cap 46 is attached by the bolts 48. Ends of the elongated baffle 100 may be received in corresponding bore recesses 102 machined or otherwise formed in diametrically opposed sides of the housing bore 40. Consequently, the baffle 100 has a baffle length that is greater than a housing bore inner diameter of the housing bore 40. The recesses 102 may have a longitudinal depth into the housing bore 40 to place the baffle 100 in similar proximity to the shaft end surface 32 as described above for the baffles 68, 84, 94 of the caps 64, 80, 90, respectively. The surface of the baffle 100 facing the shaft end surface 32 is generally planar. Consequently, space must be provided at the longitudinal shaft bore 34 to ensure the longitudinal shaft bore 34 is in fluid communication with the fluid supply passage 52. As shown in the end view of the housing end wall 38 of FIG. 10 with the cap 46 removed, the baffle 100 may have a width that is less than the shaft bore inner diameter of the longitudinal shaft bore 34 to allow flow between the control volume 50 and the longitudinal shaft bore 34.

Figure 11:
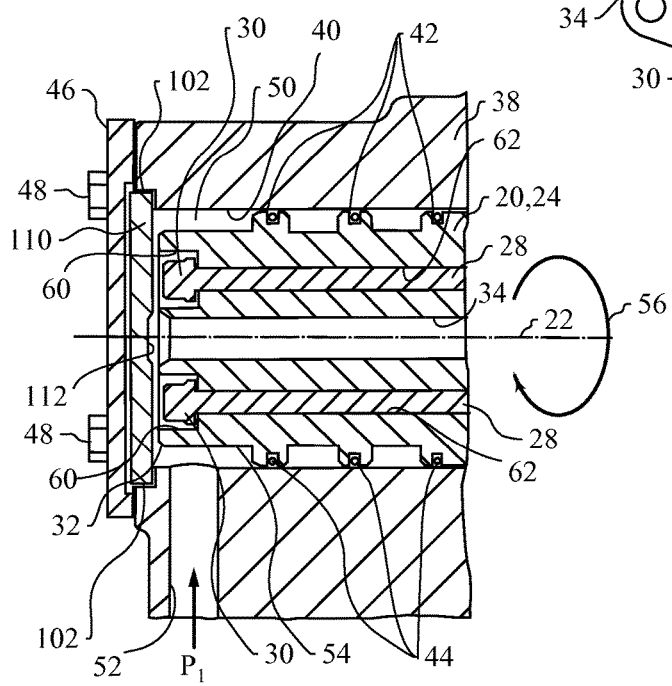
FIG. 11 is a cross-sectional view of the transmission assembly of FIG. 1 taken through line 2-2 showing the rotating/stationary element interface with another embodiment of bore pressure regulation in accordance with the present disclosure.

FIG. 11 illustrates an embodiment of a baffle 110 having a generally similar configuration as the baffle 100, but with additional spacing from the longitudinal shaft bore 34. The baffle 110 may include a recessed notch or groove 112 in the baffle end surface facing the shaft end surface 32 and positioned axially opposite the longitudinal shaft bore 34. The recessed notch 112 may have any appropriate geometry for providing space for fluid flow into the longitudinal shaft bore 34. As an alternative or in addition to the recessed notch 112, similar notches (not shown) may be formed in the sides of the baffles 100, 110 proximate the longitudinal shaft bore 34 for local narrowing of the width of the baffles 100, 110 and increase in space for fluid flow into the longitudinal shaft bore 34.

Figure 12:
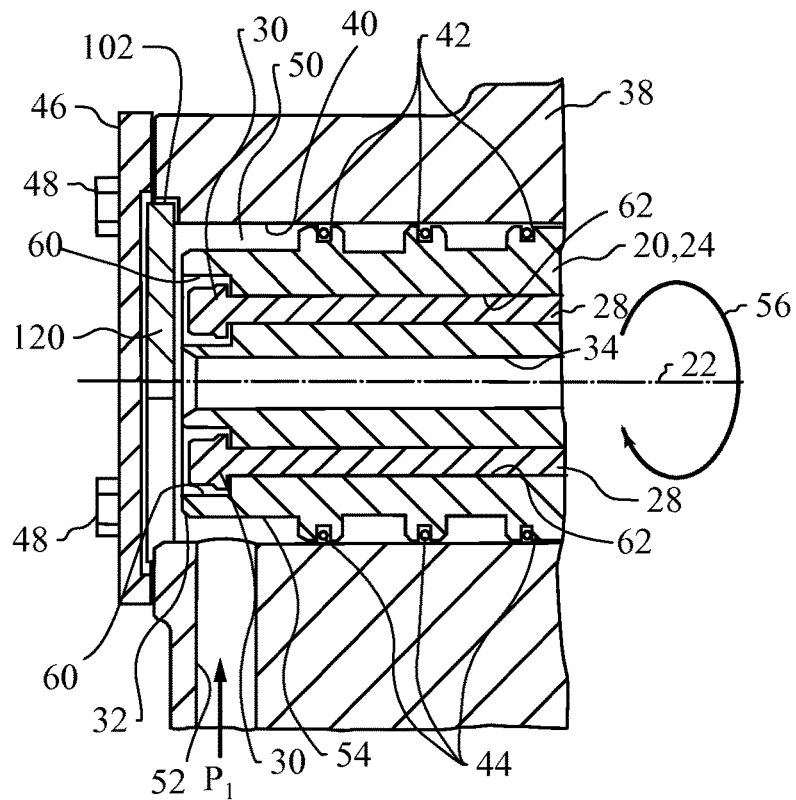
FIG. 12 is a cross-sectional view of the transmission assembly of FIG. 1 taken through line 2-2 showing the rotating/stationary element interface with another embodiment of bore pressure regulation in accordance with the present disclosure.
Figure 13:
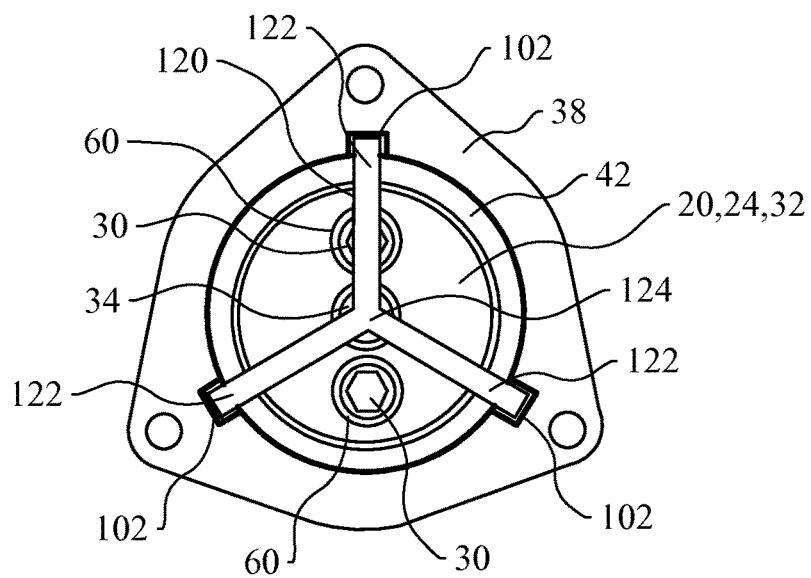
FIG. 13 is an view of the transmission assembly of FIG. 12 with the cap removed to show an integrated housing baffle for bore pressure regulation in accordance with the present disclosure.

Separate baffles may be provided in the control volume 50 in other configurations to minimize vortex flow and corresponding pressure reduction at the longitudinal shaft bore 34. FIGS. 12 and 13 illustrate an alternative embodiment of a baffle 120 having a more complex geometry than the linear baffles 100, 110 illustrated and describe above. As best seen in the end view of FIG. 13, the baffle 120 includes three circumferentially spaced baffle legs 122 extending from a common central hub 124. Ends of the baffle legs 122 are received in corresponding recesses 102 in the housing bore 40 of the housing end wall 38 so that the central hub 124 is positioned axially opposite the longitudinal shaft bore 34. The baffle legs 122 are dimensioned with widths that are narrow enough so that a cross-sectional area of the central hub 124 is smaller than the area of the longitudinal shaft bore 34 to permit flow therein as the baffle legs 122 of the baffle 120 restrict vortex fluid flow as the gear shaft 20 rotates. While three baffle legs 122 are shown in the embodiment, additional baffle legs 122 may be provided in the baffle 120 and positioned as necessary to perform the desired control for elimination of the vortex fluid flow.

Figure 14:
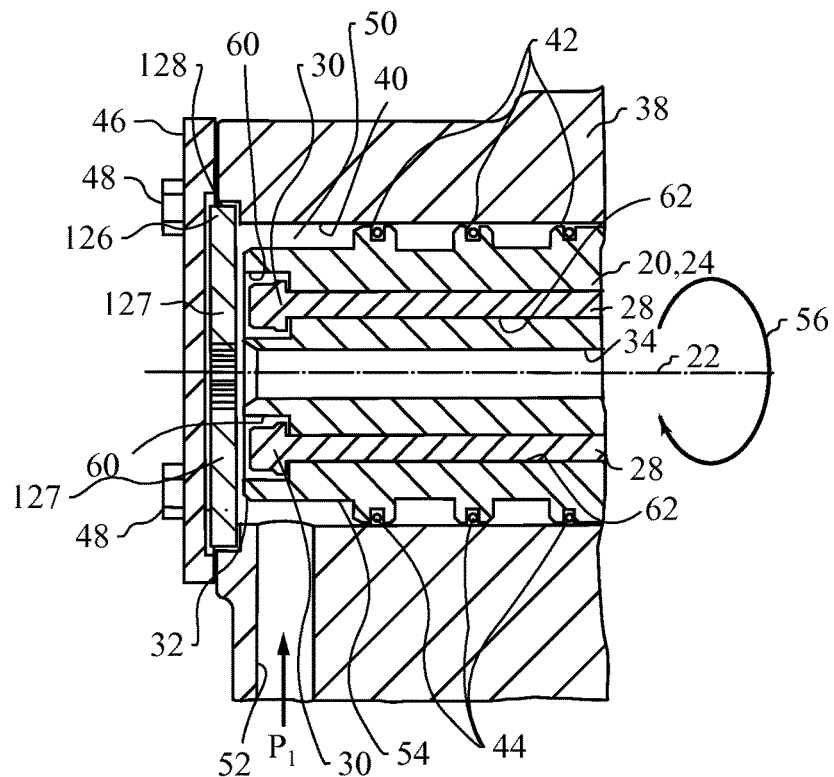
FIG. 14 is a cross-sectional view of the transmission assembly of FIG. 1 taken through line 2-2 showing the rotating/stationary element interface with another alternative embodiment of bore pressure regulation in accordance with the present disclosure.
Figure 15:
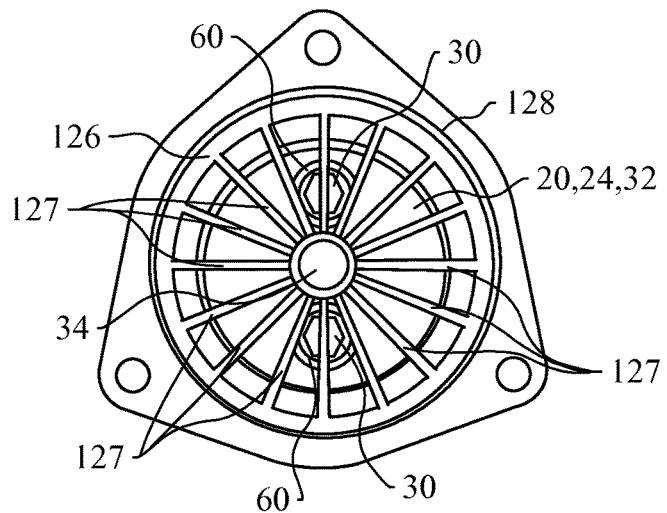
FIG. 15 is an view of the transmission assembly of FIG. 14 with the cap removed to show an integrated baffle cylinder for bore pressure regulation in accordance with the present disclosure.

Additional alternative configurations for retaining and positioning baffles within the control volume 50 for minimizing vortex flow are contemplated by the inventors. FIGS. 14 and 15 illustrate an alternative embodiment of a fluid-interacting bore pressure regulation mechanism in the form of a hollow cylinder 126 having a plurality of baffles 127 extending radially inwardly toward the longitudinal shaft bore 34 when the cylinder 126 is positioned within an annular counterbore 128 of the housing bore 40. The cylinder 126 and the baffles 127 may be integrally formed as a single unitary component by any appropriate fabrication process such as extrusion. As best seen in the end view of FIG. 15, sixteen generally planar baffles 127 extend inwardly from an inner wall of the cylinder 126, and are circumferentially spaced about the cylinder 126. The baffles 127 terminate proximate the longitudinal shaft bore 34 to retain an open area longitudinally opposite the longitudinal shaft bore 34 for fluid flow. The cylinder 126 and the counterbore 128 may be dimensioned so that the cylinder 126 must be pressed into the counterbore 128, with the press fit preventing the cylinder 126 from rotating about the bore longitudinal axis 22 when the gear shaft 20 rotates. Alternatively, the cylinder 126 may have a smaller outer diameter such that it may be press fit into the housing bore 40 without the need for the additional counterbore 128. In further alternate embodiments, more or fewer baffles 127 may extend inwardly from the cylinder 126, and the baffles 127 may have varying geometries and regular or irregular spacing there between as necessary to provide the desired interaction with the hydraulic fluid and minimization of vortex flow.

It should be noted that in alternative embodiments, the baffles 100, 110, 120, 127 may be integrally formed with the housing bore end wall or cap 46 in a similar manner as the baffles 68, 84, 94 of the caps 64, 80, 90, respectively. In such alternative embodiments, the baffles 100, 110 and the baffle legs 122 of the baffle 120 may be shortened to eliminate the recesses 102 and the corresponding machining operations, or the cylinder 126 may have a smaller outer diameter or be eliminated entirely to eliminate the counterbore 128. Still further, the caps 46, 64, 80, 90 and the baffles 68, 84, 94, 100, 110, 120, 127 may be integrally formed with the housing end wall 38 in the same manufacturing process, such as casting, to form a single unitary component. Where the components are integrally formed, the housing 12 will not have removable caps, and instead the housing end wall 38 must be removed to gain access to the shaft end portion 24 and other internal components of the transmission assembly 10.

Figure 16:
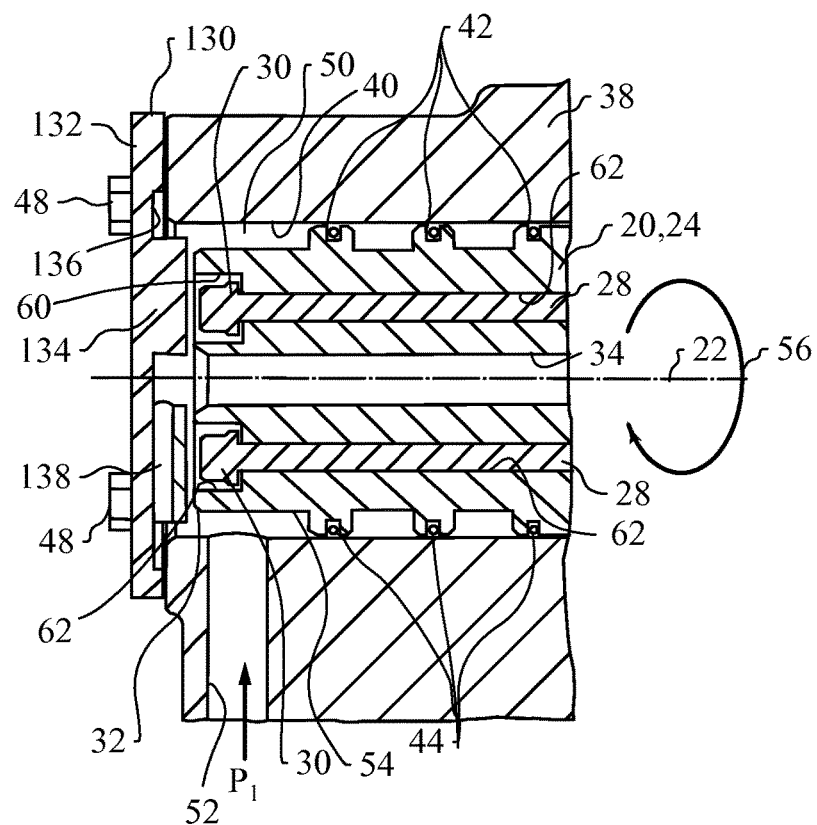
FIG. 16 is a cross-sectional view of the transmission assembly of FIG. 1 taken through line 2-2 showing the rotating/stationary element interface with another embodiment of bore pressure regulation in accordance with the present disclosure.

In alternative bore pressure control mechanisms, direct feed of pressurized hydraulic fluid may be provided proximate the opening of the longitudinal shaft bore 34 to thereby minimize the opportunity for the hydraulic fluid to be forced into vortex flow in the area of the longitudinal shaft bore 34. Such a direct feed may be provided as an alternative to or in addition to the vortex flow control provided in the embodiments presented above. In one direct feed embodiment shown in FIGS. 16 and 17, a housing bore end wall or removable cap 130 may provide a flow path from an area proximate the fluid supply passage 52 to the longitudinal shaft bore 34. The cap 130 may include a planar base or plate 132 having a cylindrical baffle portion 134 extending from a cap inner surface 136 toward the shaft end surface 32 when the cap 130 is attached to the housing end wall 38. The baffle portion 134 has cylindrical baffle portion outer surface having a baffle outer diameter that is smaller than the housing bore inner diameter of the housing end wall 38 to allow hydraulic fluid in the control volume 50 to flow around the baffle portion 134 without being restricted.

Figure 17:
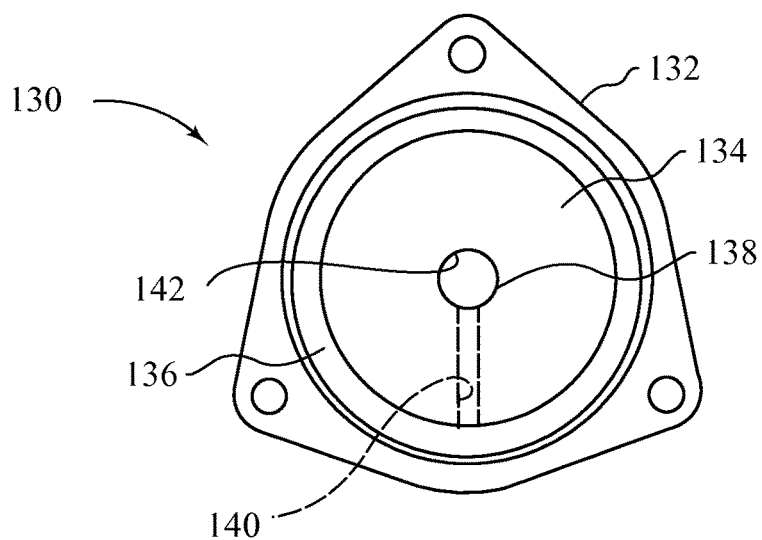
FIG. 17 is a front view of a cap of FIG. 16 having a hydraulic fluid flow channel for bore pressure regulation in accordance with the present disclosure.

The baffle portion 134 further includes a feed passage 138 there through to place the baffle portion outer surface in fluid communication with an opening through a baffle portion end surface that faces the shaft end surface 32 and is longitudinally aligned with the longitudinal shaft bore 34. Referring to FIG. 17, the feed passage 138 may include a first feed passage portion 140 extending radially inward from the baffle portion outer surface, and a second feed passage portion 142 extending longitudinally inward from the baffle portion end surface and being axially aligned with the bore longitudinal axis 22 and the longitudinal shaft bore 34 when the cap 130 is installed. When pressurized hydraulic fluid is provided through the fluid supply passage 52, the fluid flows in through the first feed passage portion 140 of the feed passage 138 and out through the second feed passage portion 142 directly to the longitudinal shaft bore 34. This arrangement yields the same approximate pressure gradient 72 shown on the left side in FIG. 4.

Figure 18:
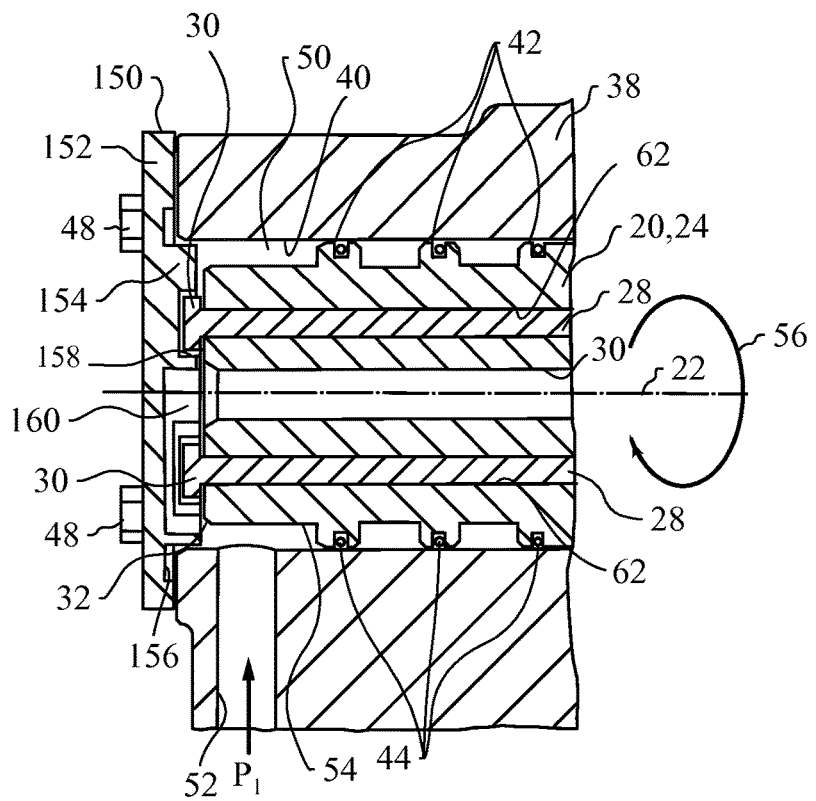
FIG. 18 is a cross-sectional view of the transmission assembly of FIG. 1 taken through line 2-2 showing the rotating/stationary element interface with another embodiment of bore pressure regulation in accordance with the present disclosure.
Figure 19:
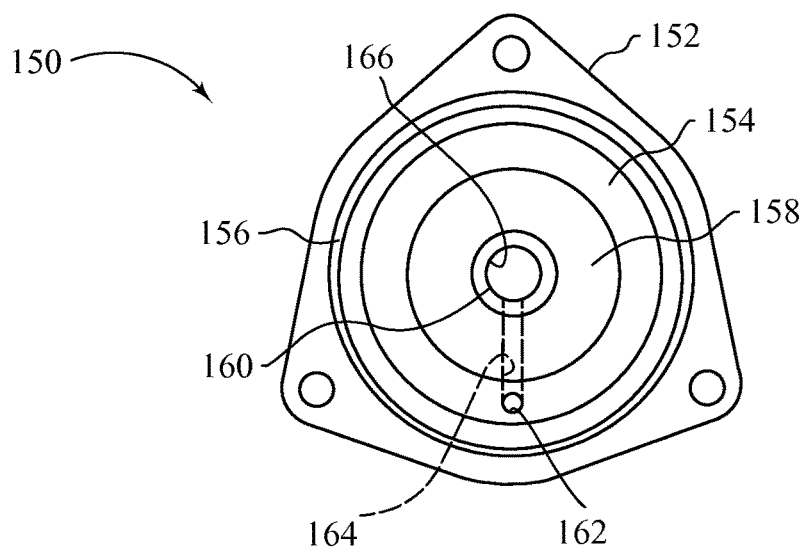
FIG. 19 is a front view of a cap of FIG. 18 having an annular bolt head clearance groove and a hydraulic fluid flow channel for bore pressure regulation in accordance with the present disclosure.

FIGS. 18 and 19 illustrate an alternative embodiment of a direct feed bore pressure control mechanism that may be implemented without modifying the housing end wall 38 or gear shaft 20. Similar to the previous embodiment, a housing bore end wall or removable cap 150 includes a planar base or plate 152 with a cylindrical baffle portion 154 extending from a cap inner surface 156. To accommodate the bolt heads 30 disposed outwardly of the shaft end surface 32 and rotating with the gear shaft 20, the baffle portion 154 may include an annular clearance groove 158 in the baffle portion end surface that is centered on the bore longitudinal axis 22 when the cap 150 is installed. The baffle portion 154 further includes a feed passage 160 placing the fluid supply passage in fluid communication with the longitudinal shaft bore 34. The feed passage 160 may include a first feed passage portion 162 extending longitudinally from the baffle portion end surface and generally aligned with the gap between the surfaces 40, 54 to allow flow of hydraulic fluid. A second feed passage portion 164 of the feed passage 160 may extend radially inwardly from the first feed passage portion 162 toward the longitudinal center of the baffle portion 154 where the second feed passage portion 164 intersects a third feed passage portion 166 of the feed passage 160 extending longitudinally inwardly from the baffle portion end surface and being axially aligned with the bore longitudinal axis 22 and the longitudinal shaft bore 34 when the cap 150 is installed. In a similar manner as described above, pressurized hydraulic fluid from the fluid supply passage 52 flows in through the first feed passage portion 162 of the feed passage 138, through the second feed passage portion 164, and out through the third feed passage portion 166 directly to the longitudinal shaft bore 34. This arrangement yields a pressure distribution across the housing bore 40 similar to that shown in pressure gradient 72 of FIG. 4.

In an embodiment shown in FIGS. 20 and 21, the bore pressure control mechanism may incorporate aspects of both vortex flow minimization and direct pressure feed to the longitudinal shaft bore 34. In this embodiment, the cap 64 of FIGS. 4 and 5 may be modified to provide direct feed of the pressurized hydraulic fluid to the longitudinal shaft bore 34 by machining or otherwise forming a throughbore 170 through the plate 66 in the gap between the baffles 68. As seen in FIG. 20, the throughbore 170 will be longitudinally aligned with the longitudinal shaft bore 34 when the cap 64 is installed on the housing end wall 38. The throughbore 170 may be placed in fluid communication with a separate fluid conduit (not shown) attached to the exterior of the cap 64 at the throughbore 170. The fluid conduit may be implemented separately from fluid supply passage 52, or the passage 52 may be accessed by an additional passage (not shown) through the housing end wall 38 and to which the fluid conduit may be connected to place the fluid supply passage in fluid communication with the throughbore 170. In a further embodiment, the fluid supply passage 52 may be omitted, and the fluid conduit placing the throughbore 170 in fluid communication with the pressurized hydraulic fluid source may be the lone source providing pressurized fluid to the cavity or control volume 50.

In a further alternative direct feed embodiment shown in FIG. 22, the housing bore end wall or one of the caps having a baffle portion, such as the cap 130 with baffle portion 134, may provide with a throughbore 180 in place of the feed passage 138. The throughbore 180 may be machined or otherwise formed through the plate 132 and the baffle portion 134, and longitudinally aligned with the longitudinal shaft bore 34 when the cap 130 is attached to the housing end wall 38. A separate fluid conduit may be attached to the exterior of the cap 130 in a similar manner as discussed above to provide pressurized hydraulic fluid through the throughbore 180 to the longitudinal shaft bore 34. In this embodiment, the outlet of the throughbore 180 may be placed in close proximity to the shaft end surface 32 to further limit the effects of any vortex flow that may still occur in the control volume 50 and to maintain the fluid pressure within the longitudinal shaft bore 34. In alternate embodiments, shaft seals (not shown) may be provided between the shaft end surface 32 and a baffle portion end surface to provide direct flow of pressurized fluid from the throughbore 180 into the longitudinal shaft bore 34 without leakage into the surrounding cavity 50. If the fluid supply passage 52 is also omitted in lieu of the hydraulic fluid provided via the throughbore 180, the cavity 50 may be substantially free of hydraulic fluid.

INDUSTRIAL APPLICABILITY

In the various embodiments illustrated and described herein, the bore pressure regulating mechanisms provide more consistent pressure in the desired location of the control volume at the rotating-stationary component interfaces by interacting with the hydraulic fluid in the control volume 50. In particular, the bore pressure regulating mechanisms maintain the pressure of the hydraulic fluid proximate the longitudinal shaft bore 34 of the gear shaft 20 at or approximately equal to the supply pressure $P_1$ of the fluid supply passage 52 when the gear shaft 20 rotates within the housing bore 40 of the housing end wall 38. The various baffle configurations of the bore pressure regulating mechanisms minimize the vortex flow of the hydraulic fluid that is induced by the rotation of the gear shaft 20 in the previously open space of the control volume 50. In other configurations, or in combination with the baffle configurations, the direct feed arrangements of the bore pressure regulating mechanisms provide pressurized hydraulic fluid proximate the opening of the longitudinal shaft bore 34 of the gear shaft 20 to minimize the opportunity for the directly fed hydraulic fluid to be subject to the shear forces of the rotating gear shaft 20 that cause vortex flows and corresponding pressure drops within the control volume 50. In the particular implementations illustrated and described herein, the bore pressure regulating mechanisms may ensure that the desired pressure at a balance piston of a clutch for the gear shaft 20 so that the clutch operates to engage and disengage the gear shaft 20 according to the control strategy for performing gear shifting implemented in the transmission assembly 10. However, those skilled in the art will understand that bore pressure regulating mechanisms in accordance with the present disclosure may be implemented in other environments to minimize or eliminate the effects of vortex flow on pressure distributions in control volumes at rotating-stationary component interfaces.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A component interface for a rotating shaft and a stationary housing of a transmission, comprising:
   a housing having a housing bore defining a bore longitudinal axis, and a fluid supply passage intersecting the housing bore;
   a cylindrical shaft aligned along the bore longitudinal axis, the cylindrical shaft having a longitudinal shaft bore extending through the cylindrical shaft from an opening through a shaft end surface of the cylindrical shaft, wherein a shaft end portion of the cylindrical shaft is received by the housing bore and rotatably supported therein, wherein the housing bore and the shaft end portion define a control volume and the fluid supply passage places the control volume in fluid communication with a pressurized hydraulic fluid source for supplying pressurized hydraulic fluid having a supply pressure; and
   a bore pressure control mechanism disposed within the control volume and interacting with the pressurized hydraulic fluid within the control volume to maintain a shaft bore pressure at the opening of the longitudinal shaft bore approximately equal to the supply pressure when the cylindrical shaft rotates about the bore longitudinal axis.

2. The component interface according to claim 1, wherein the bore pressure control mechanism comprises a baffle disposed within the control volume and engaged by the housing, wherein the baffle engages the pressurized hydraulic fluid to reduce vortex flow of the pressurized hydraulic fluid about the bore longitudinal axis when the cylindrical shaft rotates.

3. The component interface according to claim 2, wherein the housing includes a cap having a cap inner surface and being attached to an open end of the housing bore, wherein the baffle comprises a first baffle extending inwardly from the cap inner surface toward the shaft end surface, and a second baffle extending inwardly from the cap inner surface toward the shaft end surface and being spaced from the first baffle to define a gap there between that is substantially axially aligned with the longitudinal shaft bore when the cap is attached to the housing wall.

4. The component interface according to claim 3, including a third baffle extending inwardly from the cap inner surface toward the shaft end surface, wherein the first baffle, the second baffle and the third baffle are circumferentially spaced about the bore longitudinal axis and are spaced from each other to define a gap there between that is substantially axially aligned with the longitudinal shaft bore when the cap is attached to the housing wall.

5. The rotating-stationary component interface according to claim 2, wherein the baffle comprises an elongated baffle having a baffle length that is greater than a housing bore inner diameter, and wherein the housing bore includes a first bore recess and a second bore recess formed in diametrically opposed sides of the housing bore, with each of the first bore recess and the second bore recess receiving a corresponding elongated baffle end.

6. The rotating-stationary component interface according to claim 5, wherein the elongated baffle comprises a recessed notch in a baffle end surface facing the shaft end surface, with the recessed notch being axially aligned with the longitudinal shaft bore.

7. The rotating-stationary component interface according to claim 2, wherein the baffle comprises a first baffle leg, a second baffle leg and a third baffle leg each extending from a central hub and being circumferentially spaced from each other, and wherein the housing bore includes a first bore recess, a second bore recess and a third bore recess formed in the housing bore and being circumferentially spaced from each other, with each of the first bore recess, the second bore recess and the third bore recess receiving a baffle leg end of a corresponding one of the first baffle leg, the second baffle leg and the third baffle leg.

8. The rotating-stationary component interface according to claim 2, wherein the housing wall comprises a cap having a cap inner surface and being attached to an open end of the housing bore, wherein the baffle comprises a cylindrical baffle portion extending inwardly from the cap inner surface toward the shaft end surface, the cylindrical baffle portion having a feed passage there through placing a baffle portion outer surface in fluid communication with a baffle portion end surface facing the opening of the longitudinal shaft bore.

9. The rotating-stationary component interface according to claim 2, wherein the housing wall comprises a cap having a cap inner surface and being attached to an open end of the housing bore, wherein the baffle comprises a cylindrical baffle portion extending inwardly from the cap inner surface toward the shaft end surface, the removable cap and the cylindrical baffle portion having a throughbore there through axially aligned with the longitudinal shaft bore, and wherein the bore pressure control mechanism further comprises a fluid conduit placing a throughbore opening in an outer surface of the removable cap in fluid communication with the pressurized hydraulic fluid source.

10. A bore pressure control mechanism for a component interface of a rotating shaft and a stationary housing of a transmission comprising:
    a housing having a housing bore with a bore longitudinal axis, a fluid supply passage intersecting the housing bore, and a cylindrical shaft aligned along the bore longitudinal axis, the cylindrical shaft having a longitudinal shaft bore extending through the cylindrical shaft from an opening through a shaft end surface, wherein a shaft end portion of the cylindrical shaft is received by the housing bore and rotatably supported therein, and wherein the housing wall and the shaft end portion define a control volume and the fluid supply passage places the control volume in fluid communication with a pressurized hydraulic fluid source for supplying pressurized hydraulic fluid having a supply pressure, the bore pressure control mechanism; and
    a baffle disposed within the control volume and engaged by the housing wall, wherein the baffle engages the pressurized hydraulic fluid to reduce vortex flow of the pressurized hydraulic fluid about the bore longitudinal axis when the cylindrical shaft rotates about the bore longitudinal axis to maintain a shaft bore pressure at the opening of the longitudinal shaft bore approximately equal to the supply pressure when the cylindrical shaft rotates.

11. The bore pressure control mechanism according to claim 10, wherein the baffle comprises a first baffle formed with and extending inwardly from the housing bore end wall toward the shaft end surface, and a second baffle formed with and extending inwardly from a housing bore end wall toward the shaft end surface and being spaced from the first baffle to define a gap there between that is substantially axially aligned with the longitudinal shaft bore.

12. The bore pressure control mechanism according to claim including, a third baffle formed with and extending inwardly from the housing bore end wall toward the shaft end surface, wherein the first baffle, the second baffle and the third baffle are circumferentially spaced about the bore longitudinal axis and are spaced from each other to define a gap there between that is substantially axially aligned with the longitudinal shaft bore.

13. The bore pressure control mechanism according to claim 10, wherein the baffle comprises an elongated baffle having a baffle length that is greater than a housing bore inner diameter, and wherein the housing bore includes a first bore recess and a second bore recess formed in diametrically opposed sides of the housing bore, with each of the first bore recess and the second bore recess receiving a corresponding elongated baffle end.

14. The bore pressure control mechanism according to claim 13, wherein the elongated baffle comprises a recessed notch in a baffle end surface facing and the shaft end surface, with the recessed notch being axially aligned with the longitudinal shaft bore.

15. The bore pressure control mechanism according to claim 10, wherein the baffle comprises a first baffle leg, a second baffle leg and a third baffle leg each extending from a central hub and being circumferentially spaced from each other, and wherein the housing bore includes a first bore recess, a second bore recess and a third bore recess formed in the housing bore and being circumferentially spaced from each other, with each of the first bore recess, the second bore recess and the third bore recess receiving a baffle leg end of a corresponding one of the first baffle leg, the second baffle leg and the third baffle leg.

16. A bore pressure control mechanism for a rotating-stationary component interface formed by a housing wall having a housing bore with a bore longitudinal axis, and a cylindrical shaft aligned along the bore longitudinal axis and having a longitudinal shaft bore extending through the cylindrical shaft from an opening through a shaft end surface, wherein a shaft end portion of the cylindrical shaft is received by the housing bore and rotatably supported therein, and wherein the housing wall and the shaft end portion define a cavity, the bore pressure control mechanism comprising:

a cylindrical baffle portion disposed within the cavity and engaged by the housing wall; and
a feed passage through the cylindrical baffle portion to place a pressurized hydraulic fluid source for supplying pressurized hydraulic fluid having a supply pressure in fluid communication with the opening of the longitudinal shaft bore.

17. The bore pressure control mechanism according to claim 16, wherein the rotating-stationary component interface includes a fluid supply passage intersecting the housing bore to place the cavity in fluid communication with the pressurized hydraulic fluid source, and wherein the cylindrical baffle portion extends inwardly from a housing bore end wall of the housing wall toward the shaft end surface and the feed passage places a baffle portion outer surface in fluid communication with a baffle portion end surface facing the opening of the longitudinal shaft bore.

18. The bore pressure control mechanism according to claim 17, wherein the feed passage comprises a first feed passage portion extending radially inward from a cylindrical outer surface of the cylindrical baffle portion, and a second feed passage portion axially aligned with the longitudinal shaft bore, extending longitudinally inward from a baffle end surface facing the shaft end surface, and intersecting the first feed passage portion.

19. The bore pressure control mechanism according to claim 17, wherein the feed passage comprises a first feed passage portion extending longitudinally from a baffle end surface facing the shaft end surface and aligned with a gap between a bore inner surface and a shaft outer surface, a second feed passage portion extending radially inwardly from the first feed passage portion toward a longitudinal center of the cylindrical baffle portion, and a third feed passage portion axially aligned with the longitudinal shaft bore, extending longitudinally inwardly from the baffle end surface, and intersecting the second feed passage portion.

20. The bore pressure control mechanism according to claim 16, wherein the feed passage comprises a throughbore extending through a housing bore end wall of the housing wall and the cylindrical baffle portion and axially aligned with the longitudinal shaft bore, and wherein the bore pressure control mechanism further comprises a fluid conduit placing a throughbore opening in an outer surface of the housing bore end wall in fluid communication with the pressurized hydraulic fluid source.

* * * * *